United States Patent Office 2,847,709
Patented Aug. 19, 1958

2,847,709

PROCESS OF PRODUCING UNORIENTED FORMED ARTICLES FROM HIGH POLYMERS

Sterling S. Sweet, Rochester, N. Y., and Kenneth W. Scott, Akron, Ohio, and Maurice H. Van Horn, Rochester, N. Y., assignors to Eastman Kodak Company, Rochester, N. Y., a corporation of New Jersey No Drawing. Application March 14, 1955
Serial No. 494,224

3 Claims. (Cl. 18—48)

This invention relates to a process for the after-treatment of polymeric articles. More particularly this invention concerns a process for the after-treatment of formed articles such as films or sheets which have been formed from a sulfone acid-dihydroxy type of high polymeric material to obtain unoriented formed product.

In recent years considerable activity, as indicated by numerous publications and patents, has been directed to the manufacture of formed articles from polymeric materials, particularly polymeric materials which are referred to herein as "high polymers." For example, there are presently manufactured various formed articles from polymeric materials of which the so-called terephthalate type of polyester is illustrative.

In fabricating such polymeric materials into articles, as for example in preparing sheets or filaments, the polymeric material in a finely divided condition is melted and the molten polymer extruded or otherwise forced through forming members to produce the desired article. That is, in making film or sheet, the polymeric material is reduced to a flowable condition by melting and the flowable polymer forced through a die to form the film or sheet. Or, in some instances, the high polymer may be dissolved in solvents and the resultant solution cast into sheets or otherwise formed into the shaped article.

The shaped article such as sheet formed from the polymer by the aforementioned extrusion or other forming procedure, may not be particularly suitable for use as directly formed. Hence, the initially formed product such as the sheet has been subjected to a stretching treatment. This stretching treatment heretofore used generally must be biaxially in that a sheet would be stretched both lengthwise and widthwise. This stretching which has been carried out in many instances has been to the extent of several hundred percent, the stretching being facilitated by heating the formed article at temperatures on the order of 90° C.

The aforementioned stretching and heating as applied to polyesters of the type aforementioned, produces orientation and crystal growth. In some instances the crystal growth may be so rapid even in the first step of longitudinal stretch that there may be some difficulties in applying a second step of widthwise stretching. It has also been proposed to use rather complicated tentering equipment whereby a two-way stretching may be accomplished in substantially one operation.

After the stretching as aforementioned, usually the stretched article has been maintained in the tentering apparatus under considerable restraint while the stretched article is subjected to sufficient heating for setting. That is, the setting is carried out so as to produce extensive crystal growth in the stretched product which, so-to-speak, renders more permanent in the formed article the structure therein produced by the stretching operation.

The products resulting from the aforesaid procedures have an oriented structure and while they may in many instances exhibit relatively high tensile strength properties and the like, nevertheless being an oriented structure, there is present within the formed article a certain amount of internal stress.

After extensive investigation we have found that there are certain types of high polymer materials which may be readily formed into films or sheets or the like formed articles in any suitable manner and that such formed articles may be after-treated by a simpler after-treatment in accordance with the present invention with the beneficial and unusual result that a substantially unoriented formed product may be obtained. That is, the formed products of the present invention, such as sheets or films, in their finally produced condition after being processed in accordance with the steps which will be described in detail herein, are in a substantially unoriented and unstretched condition and hence do not contain internal stresses and strains to any great degree as in the case of oriented products and otherwise possess certain advantages.

This invention has for one object to provide a relatively simple and improved after-treatment process applicable to the treatment of formed articles of certain high polymeric materials. A particular object is to provide a relatively simple after-treatment process particularly useful on formed products of sulfone-acid-dihydroxy polymer whereby an unoriented formed product may be obtained. Another particular object of this invention is to provide a process for treating films or sheets formed from sulfone acid-dihydroxy polymers to improve such sheeting and to obtain a finished unoriented sheet or film. Still another object is to provide as a new product an unoriented sulfone acid-dihydroxy film or sheet or the like formed product which product is transparent and flexible and exhibits good resistance to heat distortion and to cold flow and has a low water susceptibility. Another object is to provide an unoriented polymeric sheet of the class described coated with photographic layers. Other objects will appear hereinafter.

We have found that certain high polymer materials, more specifically those which tend to crystallize slowly when stretched, when formed into shaped articles may be subjected to an after-treatment whereby the shaped article may be finally obtained in an essentially unoriented condition. For example, shaped articles, illustrated by film or sheet, treated in accordance with the present invention are advantageous in being transparent, flexible, have good resistance to heat distortion and cold flow and have low water susceptibility. We have found that the high polymers which we will refer to herein as sulfone acid-dihydroxy type of polymer are particularly suitable for use in the process of the present invention.

The formulation and manufacture of these sulfone acid-dihydroxy type of polymers just referred to is not a part of the present invention. However, the combination of this particular polymer with the particular after-treatment steps of the present invention does comprise a new combination which forms a part of the present invention. Information on sulfone acid-dihydroxy type of polymers and their preparation is given in Caldwell U. S. Patent No. 2,614,120 of October 14, 1952.

Certain specific polymeric combinations utilizable for treatment in acocrdance with the present invention are as follows:

p,p'-sulfonyl dibenzoic acid plus carbonic or oxalic acid condensed with a glycol p,p'-sulfonyl dibenzoic acid plus aliphatic dibasic straight chain acids condensed with a glycol p,p'-sulfonyl dibenzoic acid plus aliphatic dibasic branched-chain acids condensed with a glycol p,p'-sulfonyl dibenzoic acid plus aliphatic dibasic ether acids condensed with a glycol p,p'-sulfonyl dibenzoic acid condensed with an aliphatic ether glycol We have found that sulfone acid polymers as aforesaid may be formed into shaped articles in an appropriate manner. As already mentioned above, in many instances the finely divided polymeric material would be rendered molten and the molten mass forced through a forming die to produce the shaped product. That is, in making sheeting or film, the molten polymer can be forced through a slot die to obtain a sheet directly. Or, the molten polymer can be forced through a die so that a cylinder is formed, the resultant cylinder being split to give the sheet or film.

The formed article of sulfone acid-dihydroxy polymer, however made into the article, is then subjected to the following treatment in accordance with the present invention.

(1) The formed article is stretched in one or more directions at 5–15° above the second order transition temperature. It will be noted that the stretching preferably is only of the order of not more than about 200% which may be somewhat lower than the amount of stretching that heretofore has been employed in the art for treating many polymeric materials. While the stretching may be axially or biaxially as desired, as just indicated, the amount thereof would be within the general range of 50–250%. We have found that this stretching of the polymer compositions just referred to, while perhaps causing some crystal nuclei to form, does not produce any substantial amount of crystallization.

(2) The stretched product may then be suitably cooled, if desired, down to room temperature.

(3) The stretched product is then heated at a temperature below the minimum crystallization temperature and without much or any restraint. This heating step permits the stretched product to return fully or a substantial way to its original size. On this step, in comparison with the prior art, it will be noted that in prior art processes the relaxing steps have only been such that the stretched article was either not permitted to shrink any or only shrink a relatively small amount, the stretched article usually being held with considerable restraint.

4. The product which now has been permitted to return to, or substantially to, its original dimensions, is then reheated to a temperature above the minimum crystallization temperature to permit crystallization but without producing crystals large enough to scatter light or make the sheet brittle.

By the aforesaid process applied to shaped articles made from sulfone acid-dihydroxy type of polymer, an essentially unoriented but fine crystalline product may be obtained which has good resistance to heat distortion, to cold flow, and has little or no water susceptibility. In other words, since our products are unoriented and, so-to-speak, contain no residual stretch, they are relatively stable. Sheeting after-treated as aforesaid gives a product useful for cut film in the photographic industry.

A further understanding of our invention may be had from a consideration of the following examples which are set forth for illustrating certain of the preferred embodiment aspects of our invention.

*Example I*

Polymeric sheets were obtained by extruding and quenching the polymer formed from diphenyl sulfone-4,4'-dicarboxylic acid, succinic acid and pentamethylene glycol. These initially formed sheets were stretched about 200% in one direction in water at a temperature of 70° C. After cooling the sheet slightly it was then held under only very slight tension at 180° for two minutes and allowed to shrink to 120% of its original length. The unoriented sheet was then tested with polarized light and showed only slight birefringence. It was very clear, flat, tough and flexible. The sheet exhibited the following properties:

M. I. T. folds _____ 95
Tear (thickness=12 mils) _____ 700
Young's modulus _____ $2.0 \times 10^4$ kg./cm.$^2$
Tensile strength _____ 722 kg./cm.$^2$
Density _____ 1.340
Heat distortion temperature _____ 187° C.
Swell-shrink _____ 0.12%

*Example II*

A polymeric sheet formed as in Example I and having been formed from a composition of diphenyl sulfone-4,4'-dicarboxylic acid and pentamethylene glycol, was uniaxially stretched about 200% at 70° C. After cooling to a temperature below the second order transition temperature, the stretched sheet was then permitted to shrink without restraint at a temperature of about 70° C. The sheet having returned nearly to its original dimensions was then subjected to heating at 180° C. for 15 minutes for producing crystallization therein but without producing crystals large enough to scatter light and make the sheet brittle. The unoriented finished sheet was then tested as in Example I and found to be clear, tough and flexible.

*Example III*

In accordance with this example, sulfone acid-dihydroxy polymer formed from diphenyl sulfone-4,4'-dicarboxylic acid, succinic acid and pentamethylene glycol was formed into a sheet by melt extrusion. The intrinsic viscosity of the initially formed sheet was 0.92. The sheet was stretched in water at 60° C. to about 250% of its original length. After cooling somewhat the sheet was allowed to shrink with only a tension of about six lbs. per sq. inch, while heating the sheet to 180° C. for about 3 minutes. The final length of the sheet was 115% of the original. The unoriented sheet thus produced was tested by polarized light and showed substantially no birefringence. The tests showed the other properties as follows:

M. I. T. folds _____ 100
Density _____ 1.336
Tear _____ 400

*Example IV*

A polymer formed from diphenyl sulfone-4,4'-dicarboxylic acid, hydroxy pivalic acid and pentamethylene glycol was stretched one way 200% at 85° C., relaxed without restraint for 10 minutes at 90° C. and then heat treated for 10 minutes at 182° C. The final length was 105% of the original. A transparent, flexible sheet resulted.

In the above examples the tests used for determining the stated values were as follows:

The M. I. T. folds test is described in ASTM designation D 643–43 (see ASTM Standards on Plastics, May 1954).

Tear strength was measured with the Thwing-Albert research tear tester manufactured by Thwing-Albert Instrument Co., Philadelphia, Pa.

Methods of measuring modulus and tensile strength are sufficiently well-known as not to require detailed description.

Density was measured by gradient tube.

Heat distortion temperature was measured with a modified form of the apparatus described by G. M. Moelter and E. Schweizer, Ind. Eng. Chem. 41 684–689 (1949).

Swell and shrink was measured with the pin-gage (see J. M. Calhoun, "The Physical Properties and Dimensional Stability of Safety Aerographic Film," Photogrammetric Engineering, June 1947, pp. 163–221).

The crystallization temperature and time for very small crystal formation is generally within the range of 150 to 190° C., and 2 to 10 minutes.

It can be seen from the foregoing examples that the sulfone acid-dihydroxy polymer shaped article may be stretched at relatively low temperature, usually between 50 and 100° C.

The tension on the stretched article may then be entirely or substantially removed and the stretched article, under heating, permitted to return to its original dimensions or very nearly so. Inasmuch as in our process it is not required to do biaxial stretching, it is not necessary to use complicated tentering apparatus. Our stretching operations can be carried out in many instances by simple pairs of rolls. That is, roll pair 1 would operate at a slightly slower speed than roll pair 2 so that tension would be applied to the sheeting.

In the event it is desired to use tentering apparatus, this can be done in the usual manner for applying biaxial stretch. However, there is a saving by our process even when using such apparatus in that it is not necessary to use the apparatus for heat setting step and the like inasmuch as in our process the sheeting need not be held under restraint but can be allowed to return substantially to its original dimensions without restraint. The final heat step may be readily carried out without the sheet being under restraint.

Sheeting produced in accordance with our invention may have applied thereto various layers including silver halide containing photographic layers. Because of the low water susceptibility as measured by the above-mentioned swell-shrink test, as well as the resistance of the product to heat distortion, a very useful cut film product may be obtained.

The unoriented sheeting of the present invention, which, as has already been pointed out above, is substantially free of internal stresses and strain, may be used for various other purposes where a high quality sheeting is required.

We claim:

1. The method of treating sheeting formed from diphenyl sulfone-4,4'-dicarboxylic acid, succinic acid, pentamethylene glycol polymers, which polymers crystallize slowly when stretched, which comprises stretching the sheeting so that the length of the sheeting is increased 50% but not more than 250% of its length as initially formed, said stretching being carried out at a temperature from 50–100° C., cooling the stretched sheeting, then subjecting the sheeting without substantial restraint thereon to a heating of 2–10 minutes duration within the temperature range of 70° C.–180° C., whereby the sheeting not being under substantial restraint shrinks to approximately not greater than 120% of its original length and crystal formation takes place in the heated sheeting but the crystals are small so that they are not large enough to scatter light.

2. In a process of treating articles formed from sulfone acid-dihydroxy high polymers which tend to crystallize slowly when stretched, the steps which comprise subjecting the article as initially formed to a stretching treatment whereby the article is increased in length at least 50% but not greater than 250%, such stretching being carried out at a temperature from 50–100° C., cooling the stretched article, then heating the cooled article without substantial restraint at a temperature from 70–180° C. for 2–10 minutes whereby the article not being under restraint shrinks to approximately its original dimension before stretching, then subjecting the article to heating at from 150–190° C. for 2–10 minutes for obtaining very small crystal formation in the article, which crystals are not large enough to scatter light and make the product brittle.

3. In a process of treating sheeting formed from sulfone acid-dihydroxy high polymers which tend to crystallize slowly when stretched, the steps which comprise subjecting the sheeting as initially formed to a stretching treatment which increases the length of the sheeting at least 50% but not more than 250%, said stretching being carried out at a temperature of from 50–100° C., cooling the stretched sheeting, then heating the cooled sheeting without substantial restraint at a temperature of from 70–180° C. for 2–10 minutes whereby the sheeting not being under substantial restraint returns to at least approximately 115% of its original dimension before stretching, then subjecting the sheeting to a heat treatment up to 190° C. for 2–15 minutes for obtaining very small crystal formation in said sheeting.

References Cited in the file of this patent

UNITED STATES PATENTS

| | | |
|---|---|---|
| 2,059,862 | Gray | Nov. 3, 1936 |
| 2,293,673 | Hershberger | Aug. 18, 1942 |
| 2,329,571 | Wiley | Sept. 14, 1943 |
| 2,517,581 | Lowry et al. | Aug. 8, 1950 |
| 2,603,838 | Lowry et al. | July 22, 1952 |
| 2,614,120 | Caldwell | Oct. 14, 1952 |
| 2,688,773 | McIntire | Sept. 14, 1954 |